United States Patent [19]

Fletcher et al.

[11] 4,045,359
[45] Aug. 30, 1977

[54] APPARATUS FOR PHOTON EXCITED CATALYSIS

[76] Inventors: James C. Fletcher, Administrator of the National Aeronautics and Space Administration, with respect to an invention of; Melvin M. Saffren, Altadena, Calif.

[21] Appl. No.: 653,316

[22] Filed: Jan. 29, 1976

[51] Int. Cl.² ............................................. B01J 1/00
[52] U.S. Cl. ........................... 250/527; 204/157.1 R; 204/158 R; 204/162 R; 204/DIG. 11
[58] Field of Search ................ 250/527; 204/157.1 R, 204/158 R, DIG. 11, 162 R

[56] References Cited
U.S. PATENT DOCUMENTS

| 3,719,454 | 3/1973 | Shang | 204/DIG. 11 |
| 3,983,020 | 9/1976 | Moore et al. | 204/DIG. 11 |
| 4,003,809 | 1/1977 | Lyon | 204/DIG. 11 |

Primary Examiner—Howard S. Williams
Attorney, Agent, or Firm—Monte F. Mott; Wilfred Grifka; John R. Manning

[57] ABSTRACT

The yield of photonically excited gas phase reactions is increased by extracting excess energy from unstable, excited species by contacting the species with the surface of a finely divided solid.

8 Claims, 2 Drawing Figures

# 4,045,359

APPARATUS FOR PHOTON EXCITED CATALYSIS

ORIGIN OF THE IVENTION

The invention described herein was made in the performance of work under a NASA contract and is subject to the provisions of Section 305 of the National Aeronautics and Space Art of 1958, Public Law 83-568 (72 Stat. 435; 42 USC 2457).

BACKGROUND OF THE INVENTION

1. Field of the Invention

The present invention relates to heterogenous optically initiated gas phase reactions conducted at least partially in the presence of a finely divided energy sink.

2. Description of the Prior Art

There are many different methods of catalytically initiating chemical reactions. However, in most cases, the efficiency is very low and there is little or no reaction selectivity among closely related reactants such as isotopes. Thermally induced chemical reactions lead to the excitation of all degrees of freedom of the molecule, the translational, vibrational and rotational degrees of freedom being generally in thermodynamic equilibrium. Thus, there is considerable energy lost non-productively, and molecules excited at equilibrium are characterized by a potentiality to acquire activation energy to excite the bond or group with the lowest activation energy.

Recently, much progess has been made in photon induced catalysis due to the development of tuning, control and stabilization of laser radiation over a widening range of available wavelengths in the visible, untraviolet and infrared regions of the spectrum. In photon activated chemical reactions, the excitation can be selectively localized to individual bonds. Molecules initiated by laser radiation and having a vibration-mode temperature, for example, reaching tens of thousands of degrees can enter into controlled chemical reactions at rates greatly exceeding the rates of the thermal vibrational-transational relaxation. Thus, laser initiated chemical reactions are characterized not only by selectivity but also by the discrete separation of the electronic, vibrational and translational temperatures. Moreover, under controlled conditions, thermodynamic equilibrium can be perturbed and internal degrees of freedom can be selectively excited, the molecule entering the chemical reaction retains an excited mode that is resonantly excited by the frequency of the laser radiation.

Another advantage of photon generated reactions is the absence of conventional catalysts which are both expensive and subject to fouling or poisoning requiring shut down of the equipment for reactivation or replacement of the catalyst charge. Heterogenous reactions in the gas phase over solid catalysts is involved in two critically important technologies; protection of the environment by aftertreatment of stationary and non-stationary pollution emissions and synthetic fuels such as in the coal gasification process.

SUMMARY OF THE INVENTION

The present invention is concerned with increasing the yeild of photonically initiated chemical reactions. Since the photonically excited reactants or products are in a highly excited, short-lived state, they tend to dissociate into the reactants or react with other molecules present in the reaction chamber to form undesired products. In accordance with this invention the excess energy is absorbed from the unstable photonically excited gas species by transferring the excess energy to a finely divided energy absorbing particle which absorbs the excited species. Dissociation is prevented by transfer of the excess energy to the surface and the desired species is stabilied and can be further reacted if it is still in a desired vibrationally excited mode or recovered if it has been converted to the ground state.

The reaction can be conducted at temperatures and pressures much lower than those at which classical thermally-induced chemical reactions are practiced. In fact, thermal reactions will only proceed at negligible rate, if at all. Since the main function of the particle is to act as an energy sink, the nature and condition of the surface is not critical and much lower cost materials may be utilized as compared to conventional noble metal catalysts. Furthermore, poisoning of the surface is not a consideration since the gaseous product only occupies the surfacc for a short time and is then recovered. Even if there is deposition, such as from lead in an automobile exhaust converter, the coated surface would still be capable of energy absorption and stabilization of the excited species.

These and many other features and advantages of the invention will be appreciated as the invention becomes better understood by reference to the following detailed description when considered in conjunction with the accompanying drawings.

DESCRIPTION OF THE PREFERRED EMBODIMENTS

Figure 1:
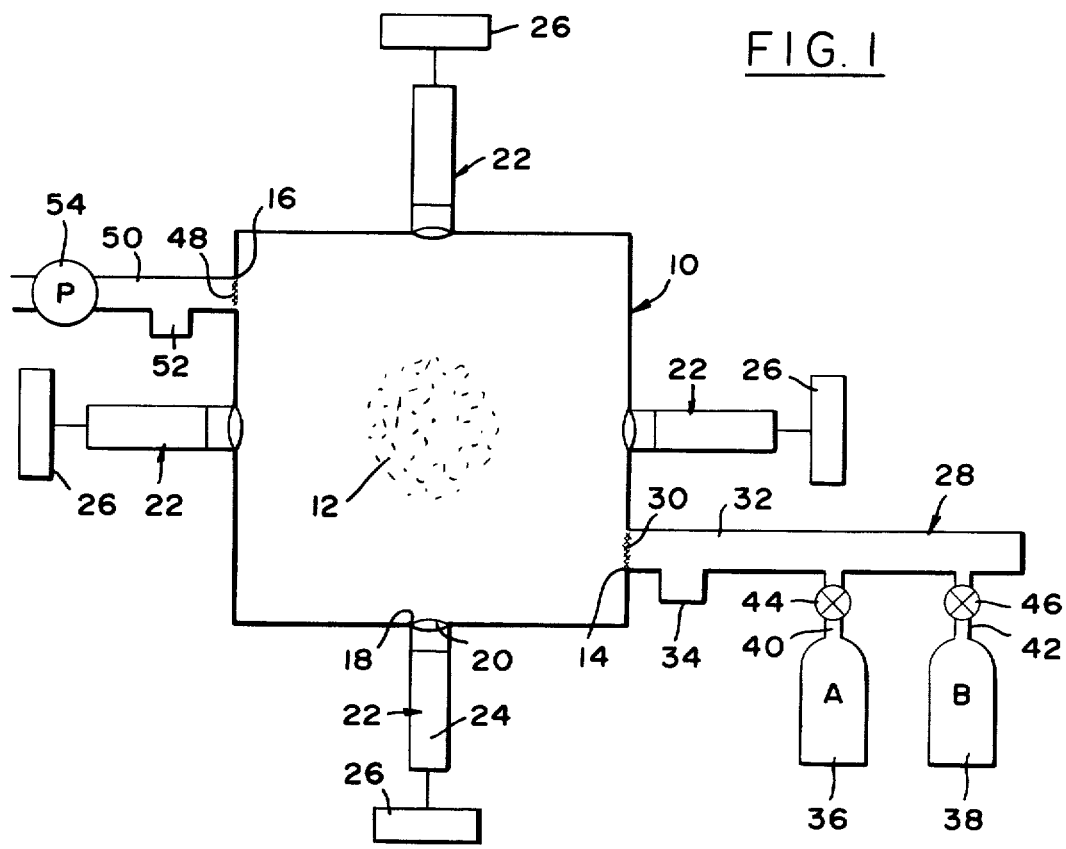
FIG. 1 is a schematic view of a first embodiment of a reactor for practice of this invention.

Referring now to FIG. 1 a closed reactor 10 includes a bed 12 of finely divided particles, an inlet 14 and outlet 16 and at least one aperture 18 in optical alignment with the particle bed 12. A transparent window or lens 20 may be provided in aperture 18 for focussing optical radiation on the bed 12.

A barrel 22 housing a light source such as a laser 24 is connected to each aperture. The laser may be a discontinuous or continuous and may be fixed or variable frequency. The laser is powered by a power source 26.

The inlet 14 is connected to a inlet assembly 28 including a screen 30 inlet conduit 32 having a trap 34 for removing undesired liquids and solids from the reactant gases. A source of first gas A and a source of a second gas B such as metered cylinders 36, 38 are connected to the conduit 32 by means of branch tubes 40, 42 containing valves 44, 46.

The outlet 16 contains a screen 48 and is connected to outlet conduit 50 containing trap 52 for removing solids from the reaction product gases. A vacuum pump 54 may be connected to conduit 50.

Gases A and B mix in conduit 34 by opening valves 44 and 46. Solids and liquids are removed by trap 34 and screen 30. The A and B gas mixture enters the reactor 10 through inlet 14 and suspends the particles to form the suspended bed 12.

One or both reactant gases absorb energy to form a photonically excited species A* and/or B*. The excited gas mixture reacts to form an unstable excited reactant C* having excess energy. C* is stabilized by transient contact with the passive surface of a finely divided particle 12 during which excess energy is transferred to the surface. Highly excited C* relaxes to a stable form C, is swept through the outlet 16 and into outlet conduit 50 for collection or further reaction. Similarly, an excited species A* can dissociate to B* and C* and the particle can absorb energy from B* and/or C* preventing recombination to A. Thus, this scheme can be used in photon enhanced dissociation.

Ideally the excited reactant or reactants are absorbed on to the surface of the energy sink particle, react thereon to form the highly excited unstable product, the product is deexcited and leaves through the outlet as in FIG. 1.

Figure 2:
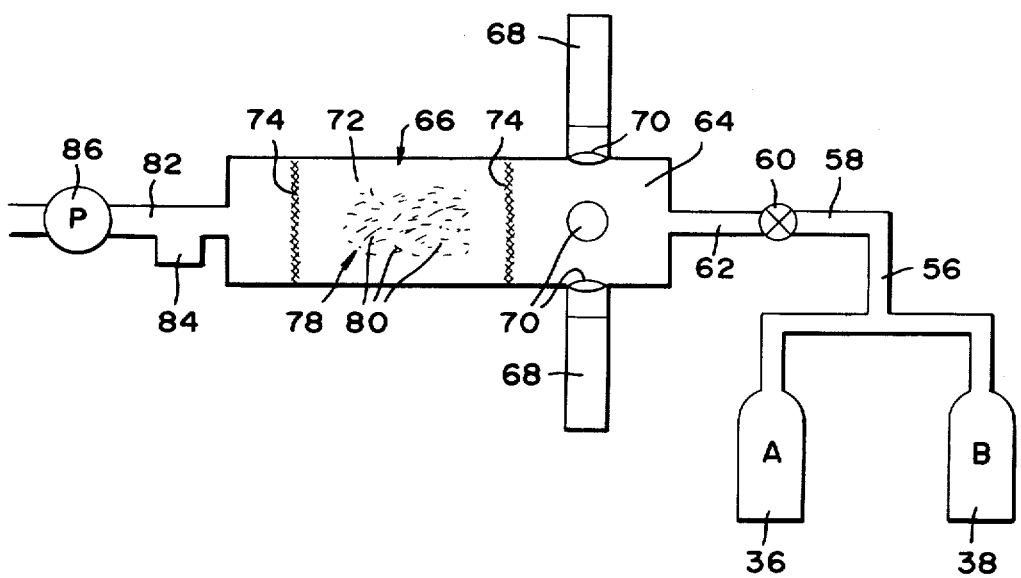
FIG. 2 is a schematic view of a second embodiment of a reactor according to this invention.

In FIG. 2 the reactants are photonically excited in a zone preceding the particle bed. The gas cylinders 36, 38 are connected to a manifold 56 which in turn is connected to the inlet tube 58 containing a valve 60. The inlet 62 leads to a first photon pumping zone 64 of the tubular reactor 66. A plurality of light source such as lasers 68 are sealingly mounted on the outside of apertures 70 provided in the wall of reactor 66 within the first zone 64.

A second deexcitation zone 72 is formed by screens 74, 76 enclosing a bed 78 of fine energy absorbing particles 80. The outlet is connected to an outlet tube 82 containing a trap 84 and vacuum pump 86 as in FIG. 1.

The light source is a high energy source, preferably a highly monocromatic, collimated, high intensity source such as a laser. The frequency of the laser is selected or is tuned by filtering or tuning to the optimum frequency for inducing the desired reaction. Since there is a possibility of loss of excitation energy due to thermalization by collision with the particles a substantial excess of energy is pumped into the reaction chamber. The inside walls of the chamber can be highly reflective to avoid absorption of the light energy. The light source can also be a broad band source such as lamps or solar radiation tuned to a narrow frequency by a filter or a monochromator.

The temperature and pressure within the reaction chamber need not to be and preferably are below the conditions at which classical, thermally induced chemical reactions occur. If such reactions do proceed, they only preceed at a neglible rate. Thus, less costly materials may be utilized for reactor construction.

The particles are selected to be inert to the reactant and product gases and to be a non-absorber for the light energy. The main role of the particle is to stabilize the reaction product. The nature and condition of the surface is not significant. If deexcited reaction product remains on the surface for a period exceeding the rate of generation of excited product, it may be necessary to replenish the bed, suitable by recycling the particles and removing product from the surface, externally of the reactor.

Poisoning of the surface with impurities or reaction by-products as in classical heterogenous catalysis is not a significant consideration as long as the "poisoned" or coated surface is still able to absorb excess energy from the excited species. Furthermore, since the particles can be very inexpensive finely divided materials such as silica, silicates, carbon, metals and the like, cost is not an important consideration if the particles are replaced when their energy absorption characteristics decrease below a desired level. In the latter case, the reaction may be run in batch mode or in countercurrent continuous mode with a bed of fluidized particle continuously moving toward the gas inlet. Thus, yield or throughout would be increased as compared to conventional thermal catalytic processes by eliminating process interruptions required for replacing or regenerating the catalytic surface.

For example the current, most widely utilized catalyst in automobile catalytic exhaust reactors is platinum which is chosen because of its activity in reducing polluting emissions. With photon-induced reactions, platinum is not necessary, the reaction proceeding by photon activation. The finely divided solid material is only required in the present invention to absorb the reactants and also to serve as a sink of energy for the electronically and vibrationally excited reaction products following photon excitation. As explained, the surface of the finely divided solid would be less susceptible to poisoning. This could be important in the refining of gasoline from crude oil containing high levels of sulfur containing compounds since sulfur is a common cracking catalyst poison.

The present process will also find use in control of gaseous industrial wastes and in coal gasification, shale oil recovery and refining and related processes leading to production of gaseous or liquid fuels such a hydrogen, hydrocarbons and alcohols.

These heterogeneous reactions can best be characterized by operation in an ultra-high vacuum system with the reaction products detected by mass spectrometry. As examples of heterogeneous, photon induced reactions are the oxidation of CO by NO or $O_2$ in the presence of finely divided Ir or Ag surfaces, which have well characterized crystallographic orientations and the methanation reaction ($H_2 + CO \rightarrow CH_4$) in the presence of finely divided Ru and Ni surfaces. Both reactions are conducted in an ultrahigh vacuum chemical reactor.

The surface of the finely divided particle should not absorb any significant energy from the excited reactant but does absorb or extract sufficient energy from the unstable highly excited product to prevent the product from dissociating or reverting to the reactant or to an undesired by-product. The energy extracted need not convert the product to the ground state. The deexcited product may be deenergized to an excited, stable state and may be isolated as an intermediate and utilized in further reactions. Alternatively, the particles covered with the desired product may be utilized in reactions of the product with further reactants as a step in a process, or the product can be removed by placing the coated particles in a solvent in which the product is soluble. After solution or reaction the particles can be recycled or discarded.

It is to be realized that only preferred embodiments of the invention have been described and that numerous substitutions, alterations and modifications may be made without departing from the spirit and scope of the invention as defined in the following claims.

What is claimed is:

1. An apparatus for increasing the yield of photonically excited gas phase reactions comprising in combination:
   a closed gas phase reactor having a reaction chamber, an inlet for flowing a gas reactant to the reaction chamber, an outlet for removing a stable gaseous reaction product from the reactor and at least one aperture;

photon source means disposed outside said reactor including a laser having the output photon emitter end connected to said aperture in optical alignment with said chamber for directing excess light energy onto the inlet gas reactant for forming at least one highly excited unstable gas species containing excess energy; and finely divided, solid, energy sink means disposed in said reactor between the inlet and outlet for stabilizing said unstable, excited species by contacting and absorbing excess energy therefrom to form said stable gaseous reaction product.

2. An apparatus according to claim 1 further including means for suspending the finely divided energy sink into a fluidized bed.

3. An apparatus according to claim 2 in which the inlet further includes a mixing chamber for mixing a plurality of reactant gases.

4. An apparatus according to claim 1 in which the reaction chamber includes an illumination portion and an energy sink portion.

5. An apparatus according to claim 1 in which the photon source means includes means for adjusting the frequency of the source to a narrow band of wavelengths.

6. An apparatus according to claim 1 in which the energy sink means includes a bed of finely divided solid particles a first gas pervious screen for separating the bed from the inlet and a second gas pervious screen for separating the bed from the outlet.

7. An apparatus according to claim 1 further including vacuum pump connected to said outlet.

8. An apparatus according to claim 1 in which the reactor includes a plurality of apertures each having the photon emitter end of a laser connected thereto focussed onto the reaction chamber.

* * * * *